United States Patent
Eberth et al.

(10) Patent No.: US 7,008,580 B2
(45) Date of Patent: Mar. 7, 2006

(54) METHOD OF PRODUCING TEXTILE PREFORMS FOR FIBER REINFORCED COMPOSITE PRODUCTS FROM TEXTILE SEMI-FINISHED ARTICLES

(75) Inventors: Ulrich Eberth, Miltenberg (DE); Paul Joern, Hamburg (DE)

(73) Assignees: Airbus Deutschland GmbH, Hamburg (DE); Fraunhofer-Gesellschaft zur Foerderung der angewandten Forschung e V., Munich (DE)

( * ) Notice: Subject to any disclaimer, the term of this patent is extended or adjusted under 35 U.S.C. 154(b) by 224 days.

(21) Appl. No.: 10/385,287

(22) Filed: Mar. 10, 2003

(65) Prior Publication Data

US 2003/0173019 A1   Sep. 18, 2003

(30) Foreign Application Priority Data

| Mar. 8, 2002 | (DE) | ................................ 102 10 104 |
| Nov. 6, 2002 | (DE) | ................................ 102 51 581 |

(51) Int. Cl.
| B29C 70/22 | (2006.01) |
| B29C 70/24 | (2006.01) |
| B29C 70/30 | (2006.01) |
| B32B 5/00 | (2006.01) |

(52) U.S. Cl. ....................... 264/103; 156/148; 156/175; 156/181; 264/135; 264/136; 264/137; 264/236; 264/257

(58) Field of Classification Search ................ 156/148, 156/175, 181; 264/103, 135, 136, 137, 236, 264/257

See application file for complete search history.

(56) References Cited

U.S. PATENT DOCUMENTS

| 4,254,599 A |   | 3/1981  | Maistre |
| 4,649,080 A | * | 3/1987  | Fischer et al. ........... 264/137 X |
| 4,891,179 A | * | 1/1990  | Peacock et al. ......... 264/257 X |
| 5,217,766 A |   | 6/1993  | Flonc et al. |
| 5,546,880 A |   | 8/1996  | Ronyak et al. |
| 2003/0168775 A1 | | 9/2003  | Eberth et al. |
| 2003/0222371 A1 | | 12/2003 | Edelmann et al. |
| 2004/0219251 A1 | | 11/2004 | Eberth et al. |

FOREIGN PATENT DOCUMENTS

| DE | 43 14 078       |   | 3/1994 |
| EP | 0185460 A2      | * | 6/1986 |

* cited by examiner

Primary Examiner—Leo B. Tentoni
(74) Attorney, Agent, or Firm—W. F. Fasse; W. G. Fasse

(57) ABSTRACT

A method of producing a textile preform to be used for making a fiber reinforced plastic composite product involves the following steps. A two- or three-dimensional semi-finished textile material or article is produced by essentially any textile production process, such as weaving, knitting or braiding. A binder is applied to the textile material, which is then subjected to a reforming and/or draping process by being applied onto a carrier and reforming tool having a contour or geometry adapted to that of the desired preform that is to be produced. Thereby, the previously unfixed fibers of the textile material are brought into the desired finished orientation and are then fixed, and the cross-sectional shape of the material is changed. This produces the preform having the desired contour, geometry and fiber orientation. The preform may then be subjected to further processing steps to form the finished composite product.

23 Claims, 1 Drawing Sheet

METHOD OF PRODUCING TEXTILE PREFORMS FOR FIBER REINFORCED COMPOSITE PRODUCTS FROM TEXTILE SEMI-FINISHED ARTICLES

CROSS-REFERENCE TO RELATED APPLICATION

This application is related to U.S. application Ser. No. 10/385,289, filed Mar. 10, 2003, the entire disclosure of which is incorporated herein by reference. This application is also related to U.S. application Ser. No. 10/836,438, filed Apr. 29, 2004.

PRIORITY CLAIM

This application is based on and claims the priority under 35 U.S.C. §119 of German Patent Applications 102 10 104.3, filed on Mar. 8, 2002 and 102 51 581.6, filed on Nov. 6, 2002, the entire disclosures of which are incorporated herein by reference.

FIELD OF THE INVENTION

The invention relates to a method of producing textile preforms from textile semi-finished materials or articles, whereby the preforms are provided for the further fabrication of fiber reinforced plastic composite products, by impregnating the preforms with a matrix or adhesive binder resin and curing the preforms under elevated temperature and possibly also elevated pressure.

BACKGROUND INFORMATION

Various different textile prefabricated articles, also called semi-finished materials and semi-finished articles in the following text, are typically used in the production of fiber reinforced plastic composite materials and products. Particularly, in addition to woven and braided materials, non-woven fleece materials and other textile webs can also be used for the textile semi-finished articles or materials. Subsequently, these semi-finished articles may be processed, packaged, cut or otherwise handled, and combined and connected with each other. The thusly resulting preforms are finally saturated or impregnated with a matrix system (e.g. resin) and then cured generally under elevated pressure and elevated temperature.

Today, textile semi-finished products, such as woven and braided materials, are typically applied or arranged in or on an intermediate carrier at the end of the production process of the textile material, e.g. the weaving or braiding process. In this regard, the intermediate carrier may, for example, be a cylindrical body upon which a braided material is wrapped or wound as an encircling strip. The geometry of such an intermediate carrier body does not serve for preforming or reforming the geometry or configuration of the semifinished material, but instead merely serves as an auxiliary support for transporting and storing the semifinished material.

During the course of the further manufacturing process, the semi-finished material or article is again removed from the intermediate carrier body, and is then processed, handled, or made up as necessary, and is then finally brought into the desired form or configuration of the required preform by carrying out reorienting and reforming of the fiber mass or body of the semi-finished material or article. In this context, several fiber orientations are fixed through the manufacturing process, and can no longer be subsequently influenced or changed thereafter. For this reason, certain component geometries can no longer be achieved using semi-finished articles that have previously been temporarily arranged on intermediate carriers, even if the actual manufacturing process would allow the attainment of such geometries without the limitations imposed by the use of the intermediate carrier.

It is also known to use continuous methods, in which the semi-finished material or article is delivered to the further manufacturing process directly following the web forming process. The possible reorienting and reforming of the textile semi-finished article, however, takes place without having the preceding web forming process actively oriented, configured, or arranged in relation to such a subsequent reorienting or reforming.

An exception exists in the braiding of fiber materials around a core, whereby the core has a desired geometry and has the fiber material braided externally around it, in order to achieve a desired fiber orientation. Thereafter, the utilized core can be removed. The use of cores in this manner, however, only allows certain limited geometries of the semifinished articles produced thereby. Moreover, the geometry and dimensions of the core are limited. A further exception is represented by so-called circular or spiral woven materials in which the length of individual threads of a thread system is variable, whereby a direction change of the semi-finished article in a plane can be achieved.

The fixing of semifinished articles can be carried out with the aid of a binder. The typically utilized binder systems mainly comprise thermoplastic substances, which are applied onto the semi-finished article, for example in a powder form, and are then activated under the influence of a sufficiently elevated temperature. In addition to fixing the fiber orientation, such binder systems can be used to fix the preform in a compacted condition.

In the general field of the braiding techniques, two-dimensional and three-dimensional braiding can be distinguished from each other. Three-dimensional braiding makes it possible to produce semi-finished articles with a defined cross-sectional geometry, which may be altered or changed even during the manufacturing process. By respectively guiding the individual threads of the braid in a manner that is mutually independent from each other, it is possible to produce, for example, L-shaped or U-shaped cross-sections of the semifinished articles. The resulting fiber articles have a configuration or contour that is close to the final contour, and possess a moderate draping characteristic.

Two-dimensional braiding is carried out in so-called circular braiding machines. The semi-finished article resulting thereby is a hose-shaped or tubular braided body, in which it is not possible to introduce fibers or threads that are oriented in the radial direction (90° relative to the surface of the resulting hose or tube). Two-dimensional braided bodies are readily drapable and can be further handled and processed as either a flat or a tubular-shaped semi-finished article. During the braiding process it is possible to achieve defined fiber orientations and semi-finished article geometries by braiding the fibers or threads around a core having a suitable geometry. By introducing stretched or extended fibers (so-called standing or stationary end threads) in the drawing-off direction, the draping ability can be reduced in certain selected spatial directions.

SUMMARY OF THE INVENTION

In view of the above, it is an object of the invention to provide a production method of the above discussed general type, which is adapted to the particular component or article being produced, in which two- or three-dimensional semi-finished textile articles produced according to various different textile manufacturing methods can be used for making the textile preforms. The invention further aims to avoid or overcome the disadvantages of the prior art, and to achieve additional advantages, as apparent from the present specification.

The above objects have been achieved according to the invention in a method of producing a textile preform from a textile semi-finished material, wherein the textile semi-finished material is applied or arranged on a carrier having a geometry or contour that is adapted to (e.g. corresponds to) the final intended geometry or contour of the preform that is to be produced. Moreover, directly at the end of a web-forming textile manufacturing process, the fibers of the textile semi-finished material, which have not yet been finally fixed, are brought into the desired final fiber orientation by carrying out a reforming and draping process. This can be achieved through the step of arranging the semi-finished material on the carrier.

A substantial advantage of the invention is that the semi-finished article or material is not first temporarily applied or arranged on an intermediate carrier with an insignificant configuration after the textile fabrication process, but rather is directly applied onto a reforming carrier or tool that has a contour or geometry adapted to that of the component or preform that is later to be produced. Thereby, an interaction, or that is to say a mutual reciprocal relationship, between the textile web forming process and the reforming or draping process is possible. Thus, for example, various different drawing-off lengths of standing end threads of the textile semi-finished article can be taken into account in the step of reforming the semi-finished article into a disk shape or the like. By the reforming and draping process, threads that are still slidable, movable or translatable are advantageously brought into the desired final orientation. In contrast to the process of braiding around a core, different fiber orientations and geometries are possible with the inventive method. Also, the dimensions and the geometry of the preforms are much less limited than with other methods. For example, cylindrical preforms with threads running around over 360° in the drawing-off direction can be fabricated.

It is also advantageously possible to omit the intermediate step of arranging or applying the semi-finished material onto a temporary intermediate carrier. In the inventive method, the textile web forming process and the reforming process are directly connected with each other, so that geometries can be realized, which are otherwise not possible with conventional production processes. The inventive method makes use of the fact or condition, that the fibers are not yet finally fixed at the end of the textile web forming process. In the inventive method, the fibers that are still slidable or shiftable at this point are brought into the desired final orientation by the reforming and draping processes. This desired final orientation of the fibers can, for example, be achieved by using a carrier having a geometry adapted to the final intended geometry of the preform to be produced. The omission of the intermediate step of winding or arranging the semi-finished material on a temporary intermediate carrier has the advantage of reducing damage and undulation of the fibers that otherwise result during the handling for carrying out such an intermediate step.

Further detailed features of the invention achieve additional advantages. For example, the fibers may be pre-oriented by using corresponding reforming aids and guides already during the braiding process or other textile web forming process. Furthermore, the inventive reforming and draping process that follows directly after the textile production process can be carried out by various different methods and using various different tools, for example as follows. First, the semi-finished material or article can be drawn through or along a reforming tool especially in the form of a matrix die, which changes the cross-sectional shape and partially also the fiber orientation of the semi-finished material or article (for example, a curved matrix achieves the draping of the standing end threads in the braided tube). Secondly, the semi-finished material or article can be wrapped or wound onto a reforming tool especially in the form of a matrix die, which changes the cross-sectional configuration and partially also the fiber orientation. Thirdly, the semi-finished material or article can be pressed or squeezed into or along a reforming tool or matrix die, which changes the cross-sectional configuration and partially also the fiber orientation. In addition to these reforming and draping processes, the semifinished article can simultaneously be compacted.

The fiber orientation existing after the reforming and draping process can be achieved by fixing the fibers relative to each other, by means of the fibers themselves, an added binder, or the matrix system of the finished preform. As a first example, fixing is achieved by the fibers themselves, in that the friction of the fibers relative to one another prevents a further sliding displacement of the fibers. Secondly, the fixing of the fibers can be achieved using an added binder, and particularly by introducing a binder before, during or after the reforming or draping process, so that the fibers become fixed by the binder. Thirdly, the fixing of the fibers can be achieved by using the matrix material (e.g. resin) that will be provided for the finished preform, namely by introducing the matrix material into the fibers either before, during or after the reforming or draping process, to thereby fix the fibers. Fourthly, a resin can be introduced, and then the resin is partially or completely cured, or the viscosity thereof is reduced, whereby the fibers are fixed.

Many different textile production methods can be used for producing the textile semi-finished material as the starting point for the inventive method. For example, the semi-finished material can be produced by textile production methods for two-dimensional fabric webs or fabrics (for example 2-D woven webs, 2-D knitted materials, 2-D braided materials, fiber fleece materials, or the like). Alternatively, the textile semi-finished material can be produced by textile production methods for three-dimensional textile webs or fabrics (for example 3-D woven webs, 3-D or spaced knit materials, 3-D braided materials, or the like).

BRIEF DESCRIPTION OF THE DRAWINGS

In order that the invention may be clearly understood, it will now be described in connection with example embodiments thereof, with reference to the accompanying drawings, wherein.

DETAILED DESCRIPTION OF A PREFERRED EXAMPLE EMBODIMENT AND OF THE BEST MODE OF THE INVENTION

Figure 1:
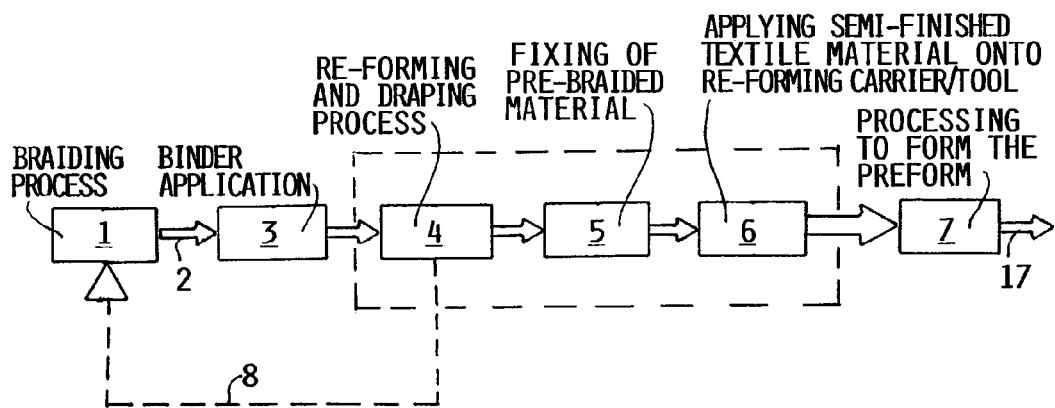
FIG. 1 is a schematic block diagram or flow diagram representing the process sequence of the inventive method.

FIG. 1 is a schematic block diagram for explaining the general concept of the inventive method of producing a textile preform from a textile semi-finished material or article, in connection with a particular example embodiment using a braiding process to form the semi-finished material or article. In this example, the method includes a braiding process 1 for producing a loose and drapable pre-braided material 2, the optional application 3 of a binder, for example in the form of a thermoplastic powder, onto the pre-braided material 2, a reforming or draping process 4 applied to the pre-braided material 2, a fixing step 5 of fixing the fibers of the pre-braided material 2 to form a textile semi-finished article, an application step 6 of applying the textile semi-finished article onto a carrier (e.g. 9, see FIGS. 2A and 2B), and a subsequent processing step 7 of further treating or processing the semi-finished article to form thereof a textile preform, which is provided for the subsequent manufacture of a fiber reinforced plastic composite product 17 therefrom.

A reciprocal or mutual interaction can take place between the braiding process 1 (as a particular example of the textile web forming process 1) and the reforming or draping process 4, as is schematically indicated by the dashed connection line 8, representing an effective feedback, whereby the braiding process 1 may take into account the fiber orientation and configuration desired for the reforming or draping process 4. Also, as indicated by a dashed line box around the process steps 4, 5 and 6, it should be understood that the reforming and draping process 4, and the fixing process 5, can be achieved concurrently or together with the step 6 of applying the material onto the reforming carrier. Most simply, the step of applying the material onto the carrier effectuates the steps of reforming and draping the material and then fixing the fiber orientation of the reformed material.

Figure 2A:
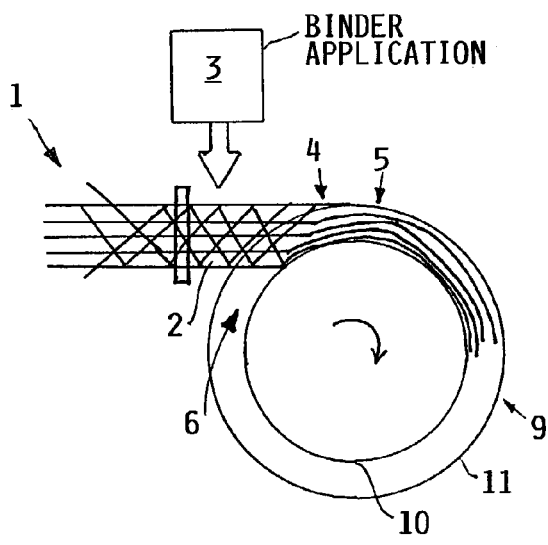
FIG. 2A is a schematic front elevation view of a representative apparatus for carrying out the method according to FIG. 1.
Figure 2B:
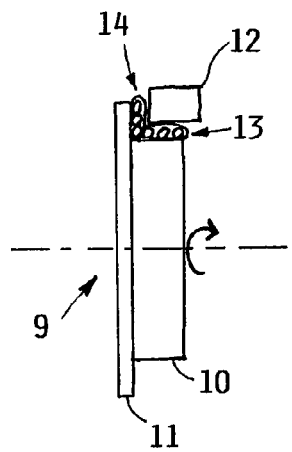
FIG. 2B is a sectional side view of the apparatus according to FIG. 2A.

The schematic generalized apparatus shown in FIGS. 2A and 2B represents one possible simple embodiment among many different possible apparatuses that could be used. This embodiment involves a rotating carrier and reforming tool 9 that comprises a drum 10 with a boundary flange disk 11 secured on a side of the drum 10. The disk 11 has a diameter greater than and protruding beyond the diameter of the drum 10. The loose drapable pre-braided material 2, which may optionally be provided with a binder in the binder application step 3 as explained above, is laid and wound onto the drum 10 and onto the protruding flange disk 11. The drum 10, or in general the tool 9, simultaneously serves to achieve the fixed positioning and storage of the pre-braided material 2, as well as transporting the reformed semi-finished article. As seen in FIG. 2B, additional reforming and counter-pressing rolls 12 can be provided for pressing the braided material 2 against the drum 10 and the flange disk 11. These rolls 12 may, if needed, be equipped with a heater or a cooling device, for heating or cooling the binder, to achieve the curing and hardening thereof.

As can further be seen in FIG. 2B, standing end threads, that is to say extending or stretched threads, of uniform length 13 are arranged on the circumference of the drum 10, while standing end threads having a variable length 14 lie against the radially protruding annular surface of the bounding flange disk 11. In other words, the threads 13 extending longitudinally in the lengthwise direction of the braided material 2 all have the same length and thus extend along the uniform circumferential length of the drum 10. On the other hand, the threads 14 extending in the longitudinal direction of the braided material 2 have various different lengths, whereby the threads 14 located closer to the drum 10 have a shorter length, while the threads 14 located farther from the drum 10 and closer to the radially outer edge of the flange disk 11, have a longer length. These varying lengths correspond to the differing circumferential arc lengths at different radial positions along the annular side surface of the disk 11, so that the threads 14 form an annular flange protruding from the cylindrical main body formed by the threads 13, in the semi-finished article. A similar principle is also used in typical 2-D weaving techniques, in that the length of individual threads of a thread system (for example warp threads) is variable, so as to achieve a directional change in the plane of the textile web. Such a technique is used for so-called circular or spiral woven webs. However, such a directional change in a woven web is achieved solely in a single plane. To the contrary, this concept in the inventive method achieves a varying three-dimensional geometry of the semi-finished article by means of the reforming and draping steps directly following the weaving or braiding process.

The resulting preform thus has a three-dimensional circular ring shape with a cylindrical hub formed by the threads 13 and a protruding annular flange rim formed by the threads 14. As needed, the preform may thereafter be trimmed, cut, combined with other members, impregnated with a resin matrix material, and cured, and/or subjected to any conventionally known preform processing steps, to fabricate therefrom the finished fiber reinforced plastic composite product.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims.

What is claimed is:

1. A method of producing a textile preform for the subsequent manufacture of a fiber reinforced plastic composite product, comprising the steps:
   a) producing a semi-finished textile material including unfixed fibers that are not yet entirely finally fixed, by a textile production process;
   b) carrying out a reforming and/or draping process involving reforming and/or draping said semi-finished textile material to re-orient said unfixed fibers into a desired fiber orientation of said preform; and
   c) applying said semi-finished textile material onto a carrier having a geometry adapted to a final intended geometry of said preform, to thereby form said preform having said final intended geometry, wherein said carrier comprises a reforming tool that comprises a curved matrix die onto and around which said semi-finished textile material is draped;

wherein said steps b) and c) together comprise drawing said semi-finished textile material through or along said reforming tool, which changes a cross-sectional shape of said semi-finished textile material into said final intended geometry and at least partially changes an orientation of at least a portion of said unfixed fibers whereby said unfixed fibers are re-oriented into said desired fiber orientation of said preform.

2. The method according to claim 1, wherein said step b) is carried out directly following said step a).

3. The method according to claim 1, expressly excluding a step of temporarily arranging said semi-finished textile material on a temporary carrier having a geometry different from and unrelated to said final intended geometry of said preform.

4. The method according to claim 1, wherein said steps b) and c) are achieved concurrently, with said reforming and/or draping of said semi-finished textile material being achieved by performing said applying of said semi-finished textile material onto said carrier.

5. The method according to claim 1, wherein said textile production process is a two-dimensional textile production process.

6. The method according to claim 1, wherein said textile production process is a three-dimensional textile production process.

7. The method according to claim 1, wherein said textile production process is a weaving process, and said semi-finished textile material comprises a woven textile.

8. The method according to claim 1, wherein said textile production process is a braiding process, and said semi-finished textile material comprises a braided textile.

9. The method according to claim 1, wherein said semi-finished textile material includes standing end threads.

10. The method according to claim 1, wherein said steps b) and c) together further comprise winding, wrapping or laying-up said semi-finished textile material onto said reforming tool, which changes said cross-sectional shape of said semi-finished textile material into said final intended geometry and at least partially changes said orientation of at least said portion of said unfixed fibers, whereby said unfixed fibers are re-oriented into said desired fiber orientation of said preform.

11. The method according to claim 1, wherein said steps b) and c) together further comprise pushing, pressing or squeezing said semi-finished textile material into, onto or along said reforming tool, which changes said cross-sectional shape of said semi-finished textile material into said final intended geometry and at least partially changes said orientation of at least said portion of said unfixed fibers, whereby said unfixed fibers are reoriented into said desired fiber orientation of said preform.

12. The method according to claim 11, wherein said pushing, pressing or squeezing comprises pressing said semi-finished textile material onto said reforming tool using a counter-pressing roller.

13. The method according to claim 1, further comprising fixing said fibers in said desired fiber orientation after said steps b) and c), due to an interengaging friction of said fibers relative to each other, which prevents further movement of said fibers out of said desired fiber orientation.

14. The method according to claim 1, further comprising applying a binder to said fibers before, during or after said reforming and/or draping process, and fixing said fibers in said desired fiber orientation by at least partly curing said binder.

15. The method according to claim 14, further in combination with processing said preform to manufacture said fiber reinforced plastic composite product, comprising applying a resin matrix material to said preform and curing said resin matrix material under an elevated temperature and/or elevated pressure.

16. The method according to claim 1, further comprising applying a resin matrix material to said fibers before, during or after said reforming and/or draping process, and fixing said fibers in said desired fiber orientation by at least partly curing said matrix material.

17. The method according to claim 16, further in combination with processing said preform to manufacture said fiber reinforced plastic composite product, comprising completely curing said resin matrix material under an elevated temperature and/or elevated pressure.

18. The method according to claim 1, further in combination with processing said preform to manufacture said fiber reinforced plastic composite product, comprising applying a resin matrix material to said preform and curing said resin matrix material under an elevated temperature and/or elevated pressure.

19. The method according to claim 1, further comprising pre-orienting said fibers at least partially in said desired fiber orientation of said preform already during said step a).

20. The method according to claim 1, wherein said step a) includes providing&g respective longitudinally extending fibers of varying lengths in said semi-finished textile material, and said steps b) and c) include forming a curve in said final intended geometry with said varying lengths of said longitudinally extending fibers respectively adapted to varying arc lengths at different radial positions in said curve.

21. A method of producing a textile preform for the subsequent manufacture of a fiber reinforced plastic composite product, comprising the steps:
  a) producing a semi-finished textile material including unfixed fibers that are not yet entirely finally fixed, by a textile production process;
  b) carrying out a reforming and/or draping process involving reforming and/or draping said semi-finished textile material to re-orient said unfixed fibers into a desired fiber orientation of said preform; and
  c) applying said semi-finished textile material onto a carrier having a geometry adapted to a final intended geometry of said preform, to thereby form said preform having said final intended geometry;
wherein said carrier comprises a reforming tool, and wherein said steps b) and c) together comprise pushing, pressing or squeezing said semi-finished textile material into, onto or along said reforming tool by pressing said semi-finished textile material onto said reforming tool using a counter-pressing roller, which changes a cross-sectional shape of said semi-finished textile material into said final intended geometry and at least partially changes an orientation of at least a portion of said unfixed fibers, whereby said unfixed fibers are reoriented into said desired fiber orientation of said preform.

22. The method according to claim 21, wherein said reforming tool comprises a matrix die.

23. A method of producing a textile preform for the subsequent manufacture of a fiber reinforced plastic composite product, comprising the steps:
  a) producing a semi-finished textile material including unfixed fibers that are not yet entirely finally fixed, by a textile production process;
  b) carrying out a reforming and/or draping process involving reforming and/or draping said semi-finished textile material to re-orient said unfixed fibers into a desired fiber orientation of said preform; and
  c) applying said semi-finished textile material onto a carrier having a geometry adapted to a final intended geometry of said preform, to thereby form said preform having said final intended geometry;
wherein said step a) includes providing respective longitudinally extending fibers of varying lengths in said semi-finished textile material, and said steps b) and c) include forming a curve in said final intended geometry with said varying lengths of said longitudinally extending fibers respectively adapted to varying arc lengths at different radial positions in said curve.

* * * * *

UNITED STATES PATENT AND TRADEMARK OFFICE
CERTIFICATE OF CORRECTION

PATENT NO. : 7,008,580 B2 Page 1 of 1
APPLICATION NO. : 10/385287
DATED : March 7, 2006
INVENTOR(S) : Eberth et al.

It is certified that error appears in the above-identified patent and that said Letters Patent is hereby corrected as shown below:

Column 8,
Line 13, after "providing", delete --&g--.

Signed and Sealed this

Eighteenth Day of July, 2006

JON W. DUDAS
*Director of the United States Patent and Trademark Office*